United States Patent
Fulton et al.

[15] 3,676,420

[45] July 11, 1972

[54] ROOM TEMPERATURE VULCANIZABLE SILICONE RUBBER COMPOSITION

[72] Inventors: Michael Fulton; John Darrell Jones; Christopher A. Pearce, all c/o Midland Silicones Limited, Reading, England

[22] Filed: April 15, 1970

[21] Appl. No.: 28,937

[30] Foreign Application Priority Data

April 25, 1969 Wales..................................21329/69

[52] U.S. Cl.......................260/185, 117/161 ZA, 260/37 SB, 260/46.5 G, 260/825
[51] Int. Cl...........................................................C08f 21/01
[58] Field of Search...................260/46.5 G, 825, 18 S, 37 S

[56] References Cited

UNITED STATES PATENTS

| | | | |
|---|---|---|---|
| 2,985,546 | 5/1961 | Leavitt | 117/143 |
| 3,094,497 | 6/1963 | Hyde | 260/18 |
| 3,127,363 | 3/1964 | Nitzsche et al. | 260/18 |
| 3,436,252 | 4/1969 | Neuroth | 117/155 |
| 3,436,439 | 4/1969 | Woods | 260/825 |

OTHER PUBLICATIONS

The Condensed Chemical Dictionary, 7th Edition, Reinhold Publishing Co., N.Y. (1966) page 747

*Primary Examiner*—Donald E. Czaja
*Assistant Examiner*—M. I. Marquis
*Attorney*—Robert F. Fleming, Jr., Laurence R. Hobey and Howard W. Hermann

[57] ABSTRACT

A two package room-temperature vulcanizable silicone rubber stock comprising (1) an $\alpha,\omega$-dihydroxydiorganopolysiloxane polymer and (2) a mixture of (a) a crosslinking agent selected from trialkoxysilanes, tetra-alkoxysilanes and alkylpolysilicates, (b) a condensation catalyst and (c) an alkoxy endblocked diorganopolysiloxane.

5 Claims, No Drawings

ROOM TEMPERATURE VULCANIZABLE SILICONE RUBBER COMPOSITION

This invention is directed to a silicone rubber stock which cures at ambient temperatures to form improved sealants and room-temperature vulcanized silicone rubbers. This silicone rubber stock is a two package product, that is, it is stored in two separate packages and admixed just prior to use.

Organopolysiloxane compositions which have the property of vulcanization in the absence of applied heat, the so-called room temperature vulcanizable or cold curable compositions, are now well known and have achieved considerable commercial success as, for example, coating, caulking, sealing and molding materials. One widely employed type of composition having the property of vulcanizing at ambient temperature comprises a mixture of a diorganopolysiloxane containing terminal, silicon-bonded reactive groups, a crosslinking agent, for example, an alkyl silicate or an alkyl polysilicate and a condensation catalyst. This type of composition is described in British Pat. Nos. 764,246 and 841,825. Vulcanization of such composition occurs on mixing the three essential components. To avoid premature vulcanization during storage or transport, it has become the practice to supply the compositions in two packages, which are mixed just prior to use. In such 2-package compositions, the diorganopolysiloxane is packaged separately from the condensation catalyst. The crosslinking agent may be included with either package or divided between both.

The provision of the composition in a 2-package form does, however, present certain difficulties in the preparation of the vulcanizable composition. The proportion of condensation catalyst employed is normally very small relative to the total of the other components of the composition. Consequently, difficulties are associated with the removal of the appropriate amount of the catalyst component from the one package and its homogeneous dispersion in the contents of the other package. Associated with this is the problem of obtaining accurate variation of the pot life of the vulcanizable composition by variation of the catalyst quantity. Inclusion of the crosslinking component in the same package as the catalyst overcomes the aforesaid difficulties only partially because the crosslinking component is itself employed in relatively small proportions, i.e., about 2 to 10 percent by weight based on the total weight of the composition. It has been proposed to prepare two package vulcanizable organopolysiloxane compositions in which the crosslinking agent is present in one package with the hydroxyl terminated diorganopolysiloxane, and the other package contains the condensation catalyst dispersed in an alkyl or aryl endstopped diorganopolysiloxane. Although such a method facilitates the measurement of the catalyst component and its admixture with the contents of the other package, the alkyl or aryl endstopped diorganopolysiloxane is chemically inert and does not take part in the crosslinking reaction. Because of its inert nature, the endstopped diorganopolysiloxane exudes from the surface of composition during and following vulcanization. Also the endstopped diorganopolysiloxane is often incompatible with the condensation catalyst, this resulting in a heterogeneous catalyst composition.

We have now found that the above recited difficulties can be overcome and an improved two-package vulcanizable organopolysiloxane preparation obtained if there is included in one package with the catalyst and crosslinking components a polydiorganosiloxane in which the terminal silicone atoms have alkoxy radicals attached thereto.

Accordingly, this invention provides a room-temperature vulcanizable preparation which is made up into two separately packaged parts ready for mixing together before use, one part comprising (1) a diorganopolysiloxane having terminal silicon-bonded hydroxyl radicals and the other comprising (2) a crosslinking agent selected from trialkoxysilanes, tetra-alkoxy silanes and alkyl polysilicates, (3) a condensation catalyst and (4) a diorganopolysiloxane having terminal groups of the general formula $-SiR_a)OR')_{3-a}$ wherein $a$ has a value of 0, 1 or 2, R is a monovalent hydrocarbon radical, halogenated monovalent hydrocarbon radical or a cyanoalkyl radical and R' is an alkyl radical having less than seven carbon atoms.

The invention also includes a process for the preparation of a vulcanizable composition which comprises mixing in the desired proportions the contents of the hereinabove specified packages and further includes an elastomer whenever prepared from such a composition.

Hydroxyl terminated diorganopolysiloxanes which are employed as component (1) of the preparation of this invention are well-known materials and can be any of those known to be suitable for use in the formulation of two package, room-temperature vulcanizing compositions. Such materials can be described as substantially linear diorganopolysiloxanes containing two, or approximately two, terminal silanol (—SiOH) groups per molecule.

The silicon-bonded radicals present in the diorganopolysiloxane (1) are selected from monovalent hydrocarbon radicals, monovalent halogenated hydrocarbon radicals and cyanoalkyl radicals. Examples of the organic radicals which can be present therefore are alkyl radicals such as methyl, ethyl, propyl, butyl, dodecyl and octadecyl radicals; alkenyl radicals such as vinyl, allyl and cyclohexenyl, aryl radicals such as phenyl and naphthyl and halogenated hydrocarbon radicals such as chlorophenyl, bromomethyl and trifluoropropyl radicals.

The hydroxylated diorganopolysiloxanes can vary in viscosity from freely flowing liquids to barely flowable gums. Preferably, however, the viscosity of the diorganopolysiloxane lies within the range from 500 to 40,000 cs. at 25° C. Most preferred as the hydroxylated diorganopolysiloxanes are those represented by the formula $HO[Me_2SiO]_mH$ wherein Me represents the methyl radical and $m$ has a value such that the viscosity of the diorganopolysiloxane lies within the range from 500 to 40,000 cs. at 25° C.

The crosslinking agents (2) are trialkoxysilanes, tetra-alkoxysilanes or alkyl polysilicates. Such materials are well known as crosslinking agents for 2-package cold curable compositions and include methyltrimethoxysilane, phenyltributoxysilane, vinyltri-isopropoxysilane, triethoxysilane, tetraethyl orthosilicate, tetra-n-propyl orthosilicate, tetrabutyl orthosilicate, ethylpolysilicate, isopropylpolysilicate and n-butylpolysilicate.

As the condensation catalyst (3), there may be employed one or more of organic acids, bases and metal salts of carboxylic acid. Such materials and their use as catalysts in two-package cold curable systems are well known and the choice of the most suitable catalysts for a particular formulation or application will be readily apparent to those skilled in the art. The preferred catalysts are the metal salts of carboxylic acids, for example, zinc naphthenate, lead octoate, stannous acetate, dibutyltin dilaurate, dibutyltin diacetate, dioctyltin diacetate and dibutyltin diversatate, the most preferred of these being the tin salts. If desired, more than one type of condensation catalyst can be present as component (3).

Component (4) of the preparation of this invention is a diorganopolysiloxane which is characterized by having one, two or three alkoxy radicals attached to each terminal silicon atom in the molecule. Such diorganopolysiloxanes include, for example, those having the general formula

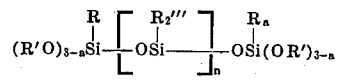

wherein each $a$ has the value of 0, 1 or 2, R' is an alkyl radical containing less than seven carbon atoms, each R and R''' are selected from monovalent hydrocarbon radicals, monovalent halogenated hydrocarbon radicals and cyanoalkyl radicals and $n$ is zero or an integer.

Polydiorganosiloxanes of this general formula can be prepared by any of several well-known methods, for example, by the reaction of a dialkoxy silane, trialkoxy silane or a tetra-alkoxy silane with a polysiloxane containing terminal silicon-bonded hydroxyl radicals. Preferably, such reaction should be performed in the presence of a catalyst such as an amine, or employing other suitable conditions for promoting the reaction of SiOH + SiOR' to form a siloxane linkage (Si—O—Si) and liberate an alcohol. Alkoxy terminated polydiorganosiloxanes for use according to this invention and methods for their preparation are described for example in British Pat. Nos. 957,255 and 957,554.

For the purpose of this invention, the silicon-bonded radicals in the diorganopolysiloxane (4) can be selected from monovalent hydrocarbon radicals and cyanoalkyl radicals as specified in respect of the hydroxylated diorganopolysiloxane (1) and as hereinbefore exemplified. Preferably, the organic radicals are selected from methyl, phenyl, vinyl and trifluoropropyl radicals, at least about 50 percent of the radicals being methyl radicals. The polydiorganosiloxanes (4) can vary in viscosity from freely flowing liquids having a viscosity of less than 10 cs. at 25° C. to highly viscous materials. Preferably, they are chosen from the lower end of the viscosity scale, that is, from about 20 to 4,000 cs. at 25° C. because the preferred catalyst compositions are those which are flowable and thus readily miscible with the contents, or a portion of the contents, of the other package.

In addition to the specified components (1), (2), (3) and (4), the preparations and compositions of this invention can contain fillers and other additives, for example, heat stability additives, dyes, plasticizers and pigments. Any of a wide variety of inert organic and inorganic filler materials can be employed including, for example, diatomaceous earths, crushed quartz, calcium carbonate, titania zirconium, silicate and ferric oxide. When a filler is present at least a major proportion of it is preferably packaged in admixture with the polydiorganosiloxane (1).

When preparing vulcanizable compositions according to this invention, at least a portion of the contents of one package is mixed with at least a portion of the contents of the other package. The relative amounts of the two packages employed can vary widely depending on the proportions of catalyst (3) and crosslinking agent (2) required in the composition and on the proportions of these materials present in the package comprising the catalyst composition. For most applications, from 0.25 to 10 percent by weight of (2) and from 0.1 to 2 percent by weight of (3) based on the weight of (1) in the vulcanizable composition will provide the desired rate of cure and degree of crosslinking in the rubber. The catalyst composition is, therefore, formulated such that the appropriate levels of (2) and (3) are obtained in the vulcanizable composition at the desired level of usage of the catalyst composition relative to that of the other package. In order to obtain the advantage arising from the use of component (4), we prefer to formulate the catalyst composition such that the desired proportions of (1), (2) and (3) in the vulcanizable composition are obtained by admixing at least 5 parts, preferably 10 to 30% parts by weight of the catalyst composition comprising (2), (3) and (4) with 100 parts of the composition comprising the diorganopolysiloxane (1).

The catalyst composition comprising (2), (3) and (4) is sensitive to water, particularly when a highly active catalyst such as stannous octoate is present therein. It is, therefore, preferably prepared and maintained in a substantially anhydrous condition if it is to be stored for a significant time prior to use. If desired, the hydrolytic stability of the catalyst composition can be improved by including therein a small proportion of a reactive silane, e.g., methyltrimethoxysilane, ethyltrimethoxysilane or vinyltrimethoxysilane as a scavenger for adventitious moisture.

The preparations of this invention can be employed in any of the wide variety of applications known for the room-temperature curing organosiloxane compositions, for example, as coating, caulking and insulating materials and in the preparation of flexible molds.

The following examples in which the parts are expressed as parts by weight illustrate the invention.

EXAMPLE 1

1.1 parts of dibutyltin dilaurate, 2.8 parts of tetraethyl orthosilicate, 4.1 parts of ethyl polysilicate, 36.8 parts of a dimethylpolysiloxane containing terminal —Si(OCH$_2$CH$_2$CH$_3$)$_3$ groups and having a viscosity of 2,000 cs. at 25° C. and 55.2 parts of a dimethylpolysiloxane containing terminal —Si(OCH$_2$CH$_{c8}{}^{cH}{}_3$)$_3$ groups and having a viscosity of 60 cs. at 25° C. were mixed under anhydrous conditions. The product was a clear liquid which was storage stable in the absence of moisture.

10 parts of this liquid was added to 100 parts of a mixture of 90 parts of zirconium silicate and 100 parts of a silanol terminated dimethylpolysiloxane having a viscosity of 2,000 cs. at 25° C. The mixture was cast into molds 40 mm deep and allowed to remain exposed to the ambient atmosphere (RH 65%, temperature 25° C.). After 16 hours, the mixture was found to have vulcanized to a firm rubber.

EXAMPLE 2

5 parts of dibutyltin dilaurate, 5 parts of n-propyl-orthosilicate and 90 parts of a dimethylpolysiloxane having terminal —Si(OCH$_2$CH$_2$CH$_3$)$_3$ groups and a viscosity of 2,000 cs. at 25° C. were mixed together. The resulting product was a homogeneous liquid which was storage stable in the absence of moisture for at least 7 days.

10 parts of this liquid was added to and thoroughly mixed with 100 parts of a composition obtained by mixing 100 parts of a silanol terminated dimethylpolysiloxane having a viscosity of 4,000 cs. at 25° C., 60 parts of crystalline silica, 10 parts of diatomaceous earth and 1 part of water. The mixture was cast into molds and allowed to remain exposed to the ambient atmosphere (RH 60%, temperature 20° C.). After 24 hours, the mixture had vulcanized to a firm rubber.

EXAMPLE 3

The procedure of Example 2 was repeated employing two further catalyst compositions A and B.

Catalyst composition A was the product obtained by mixing

| | |
|---|---|
| Dibutyltin diacetate | 5 parts |
| Ethyl polysilicate | 10 parts |
| Alkoxy terminated dimethyl-polysiloxane employed in Example 2 | 85 parts |
| Catalyst composition B was prepared by mixing | |
| Dibutyltin diversatate | 5 parts |
| n-propyl orthosilicate | 5 parts |
| Dimethylpolysiloxane having terminal —Si(OCH$_2$CH$_2$CH$_3$)$_3$ groups and viscosity of 60 cs. at 25° C. | 90 parts |

In each case, the catalyst composition was a homogeneous liquid which was storage stable for at least 7 days. Mixtures of the catalyst compositions with the compositions containing the silanol terminated polydimethylsiloxane vulcanized to a firm rubber within 24 hours.

That which is claimed is:

1. A process for the preparation of a vulcanizable composition which comprises admixing the contents of the two separate parts of a room-temperature vulcanizable preparation, one part (A) consisting essentially of (1) a diorganopolysiloxane having terminal silicon bonded hydroxyl radicals, the organic substituents in said diorganopolysiloxane being selected from the group consisting of monovalent hydrocarbon radicals, halogenated hydrocarbon radicals and cyanoalkyl radicals, and the other part (B) consisting essentially of (2) a cross-linking agent selected from trialkoxysilanes, tetraalkoxysilanes and alkoxypolysilicates, (3) a metal salt of a carboxylic acid as a condensation catalyst, and (4) a diorganopolysiloxane having terminal groups of the general formula —SiR$_a$(OR')$_{3-a}$ wherein $a$ has a value of 0, 1 or 2, each organic substituent in said diorganopolysiloxane and each R is a monovalent hydrocarbon radical, monovalent halogenated hydrocarbon radical or a cyanoalkyl radical and R' is an alkyl radical having less than seven carbon atoms.

2. A process as claimed in claim 1 wherein the diorganopolysiloxane (1) is a dimethylpolysiloxane having a viscosity within the range from 500 to 40,000 cs. at 25° C.

3. A process as claimed in claim 1 wherein the condensation catalyst is a tin salt of a carboxylic acid.

4. A process as claimed in claim 1 wherein the polydiorganosiloxane (4) has a viscosity within the range from 20 to 4,000 cs. at 25° C.

5. A process as claimed in claim 1 wherein the preparation also contains a filler, at least a major proportion of the said filler being present in admixture with the diorganopolysiloxane (1).

* * * * *